(12) United States Patent
Magg et al.

(10) Patent No.: US 8,607,691 B2
(45) Date of Patent: Dec. 17, 2013

(54) COFFEE MACHINE COMPRISING A DRAWER FOR SUPPLYING COFFEE PADS

(75) Inventors: Johann Magg, St. Georgen (DE); Andreas Mayr, Breitbrunn am Chiemsee (DE); Albert Ostermaier, Stein a.d. Traun (DE)

(73) Assignee: BSH Bosch und Seimens Hausgeraete GmbH, Munich (DE)

( * ) Notice: Subject to any disclaimer, the term of this patent is extended or adjusted under 35 U.S.C. 154(b) by 1738 days.

(21) Appl. No.: 10/586,840

(22) PCT Filed: Jan. 19, 2005

(86) PCT No.: PCT/EP2005/050221
§ 371 (c)(1),
(2), (4) Date: Jul. 20, 2006

(87) PCT Pub. No.: WO2005/072572
PCT Pub. Date: Aug. 11, 2005

(65) Prior Publication Data
US 2007/0151459 A1    Jul. 5, 2007

(30) Foreign Application Priority Data
Jan. 30, 2004   (DE) .................. 10 2004 004 818

(51) Int. Cl.
*A47J 31/06* (2006.01)

(52) U.S. Cl.
USPC .................... 99/289 R; 99/295; 99/302 R

(58) Field of Classification Search
USPC ............... 99/295, 302 R, 306, 307, 289 R
See application file for complete search history.

(56) References Cited

U.S. PATENT DOCUMENTS

| 3,260,190 | A | * | 7/1966 | Levinson | 99/295 |
| 5,111,740 | A | * | 5/1992 | Klein | 99/295 |
| 5,377,581 | A | * | 1/1995 | Campbell | 99/295 |
| 5,992,298 | A | * | 11/1999 | Illy et al. | 99/281 |
| 6,227,101 | B1 | * | 5/2001 | Rabadi et al. | 99/280 |
| 6,240,832 | B1 | | 6/2001 | Schmed et al. | |
| 6,345,570 | B1 | * | 2/2002 | Santi | 99/289 R |
| 6,510,783 | B1 | * | 1/2003 | Basile et al. | 99/289 R |
| 6,904,840 | B1 | * | 6/2005 | Pfeifer et al. | 99/295 |
| 7,237,475 | B2 | * | 7/2007 | Chen et al. | 99/302 R |
| 2004/0055473 | A1 | * | 3/2004 | Stoner | 99/295 |
| 2004/0112222 | A1 | | 6/2004 | Fischer | |
| 2008/0057171 | A1 | * | 3/2008 | Albrecht | 426/433 |

FOREIGN PATENT DOCUMENTS

| CN | 2510803 Y | 9/2002 |
| DE | 3018803 A1 | 11/1981 |
| DE | 34 32 339 | 3/1986 |

(Continued)

OTHER PUBLICATIONS

International Search Report PCT/EP2005/050221.

(Continued)

*Primary Examiner* — Reginald L Alexander
(74) *Attorney, Agent, or Firm* — James E. Howard; Andre Pallapies

(57) ABSTRACT

A coffee machine comprising a drawer for supplying coffee pads into a brew chamber of the coffee machine. In order to supply and dispose of the coffee pads as easily as possible, the drawer is positioned on the coffee machine in a detachable manner for the withdrawal thereof.

20 Claims, 5 Drawing Sheets

(56) References Cited

FOREIGN PATENT DOCUMENTS

| DE | 36 13 119 | 11/1987 |
| DE | 36 44 947 | 4/1988 |
| DE | 196 47 039 | 7/1997 |
| EP | 0 249 700 | 12/1987 |
| EP | 0 555 775 | 8/1993 |
| EP | 1 050 258 | 11/2000 |
| EP | 1 153 561 | 11/2001 |
| EP | 1 219 216 | 7/2002 |
| WO | WO 01/15582 | 3/2001 |
| WO | WO 02/38016 | 5/2002 |
| WO | WO 02/082961 | 10/2002 |

OTHER PUBLICATIONS

Report of Examination De 10 2004 004 818.5.

* cited by examiner

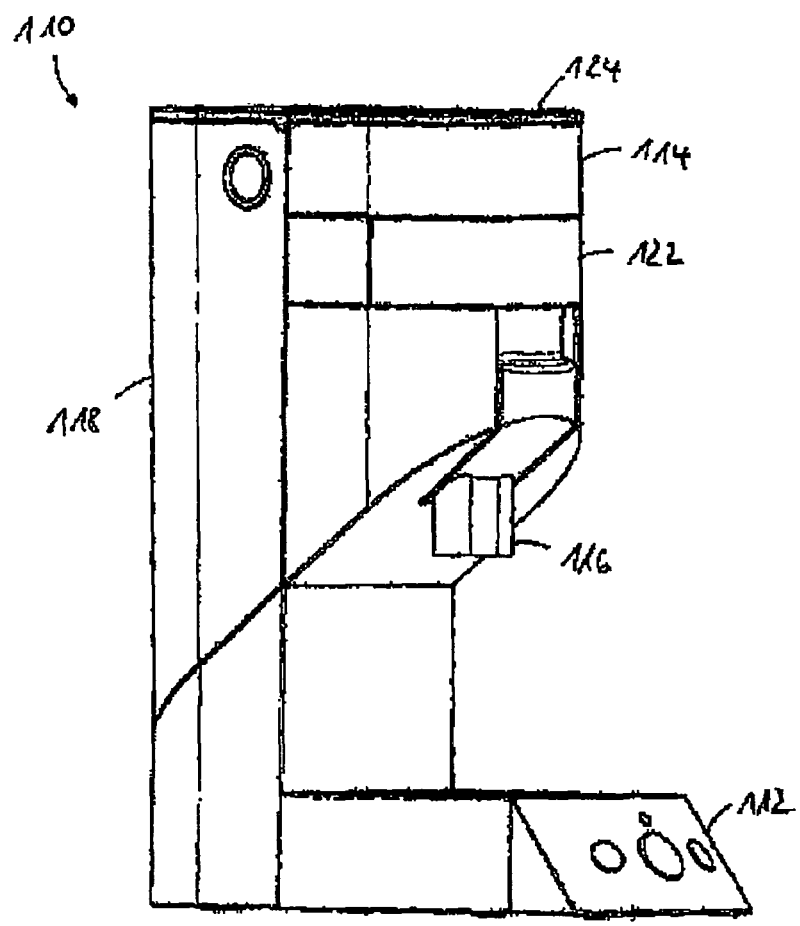

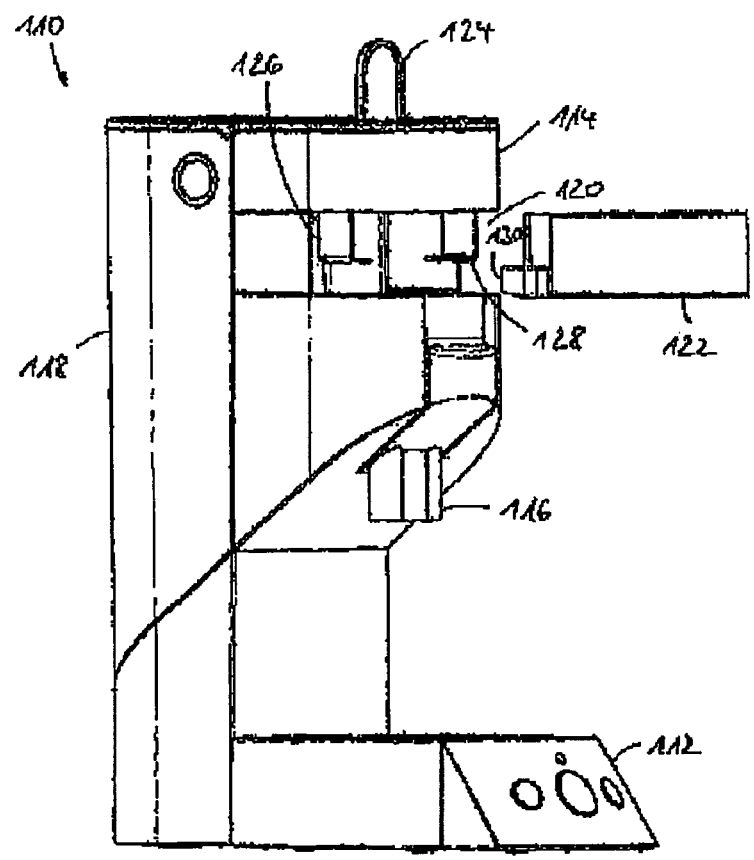

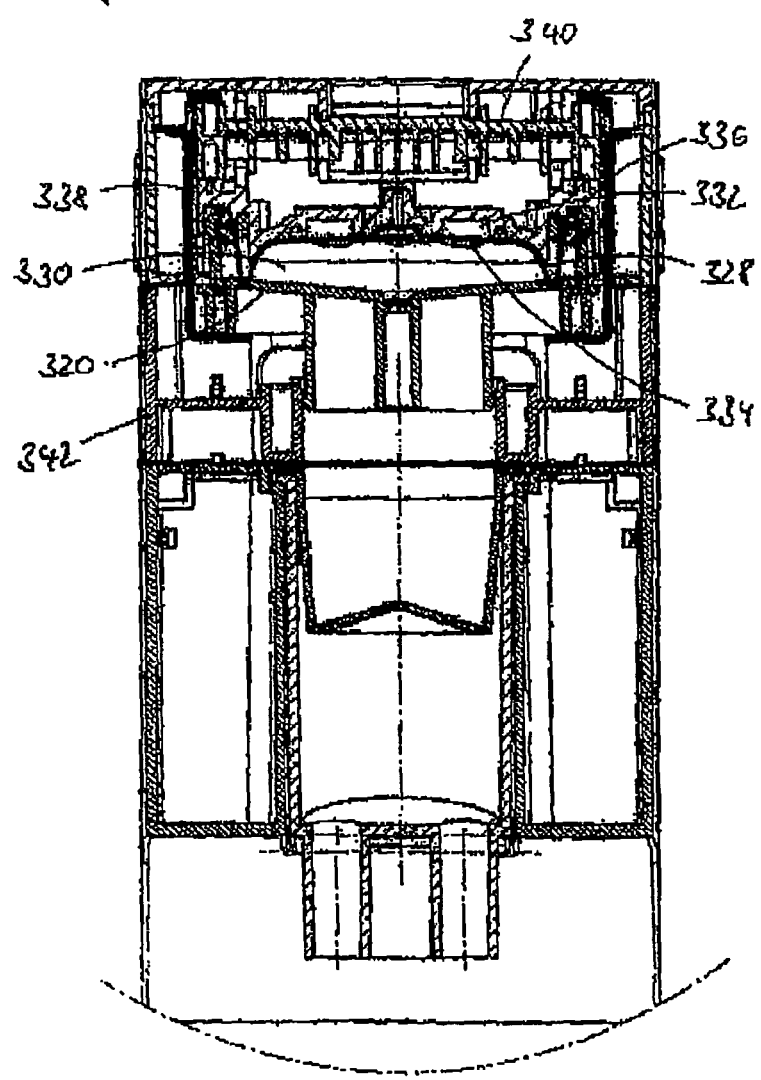

COFFEE MACHINE COMPRISING A DRAWER FOR SUPPLYING COFFEE PADS

BACKGROUND

The invention relates to a coffee machine comprising a drawer for supply coffee pads.

Coffee machines in the prior art operate according to different principles. The most common models are the so-called pressureless coffee machines. In these water flows from a storage container into an electrically heatable pipe. Particularly as a result of the evolution of steam in this pipe, heated water is then pushed through a riser to an outlet via which the heated water then drips into a coffee filter. The filter coffee can then flow from this coffee filter at atmospheric pressure into a pot.

In contrast, in espresso machines an elevated pressure prevails in the area of the coffee grounds, for example 15 bar. This is achieved by supplying water from a water container or another water supply to an electric-motor-driven pump which then supplies the water at high pressure via an electrically heatable area to a coffee grounds receiving device. This coffee grounds receiving device generally comprises a filter for receiving the coffee. In order to generate the high pressure in the coffee area, during operation the coffee grounds receiving device is located in an area which is sealed towards the atmosphere, which can be designated as a pressure chamber or brewing chamber.

In another coffee machine which operates on a different principle, it is provided to first transfer the water for preparing the coffee from a water container into a heatable intermediate container. From this intermediate container the heated water is passed to an electric-motor-driven pump from which it is supplied at elevated pressure, for example 2 to 3 bar, to a coffee grounds receiving device. In this case, it is provided that unlike in the espresso machine the coffee is not introduced into the coffee grounds receiving device in loose form as coffee grounds but is inserted in a retainer in the form of a coffee pad, that is, in compacted form surrounded by filter paper. The retainer with a retainer cover via which water is supplied can form a sealed pressure chamber. At the same time, the retainer for the coffee pads is allocated a plurality of functions. Firstly, the retainer provides a sealing surface so that a pressure chamber can be formed. Moreover, the retainer has an outlet opening from which the coffee can emerge. Furthermore, the coffee pad should be mounted in the retainer in a manner such that flow through the coffee pad is not impeded. Such a coffee machine occupies an intermediate position between a conventional pressureless coffee machine and an espresso machine.

WO 01/15582 A1 relates to a coffee machine to which the coffee grounds are supplied in the form of coffee pads. The coffee pads are inserted in a lower portion of the brewing chamber and the upper portion of the brewing chamber can be folded onto the lower portion by the user by means of a hinge, wherein an engaging connection between the two housing portions which are hinged relative to one another provides for a seal of the brewing chamber. A problem with this system is that after the brewing process the coffee pad can stick to the upper portion of the brewing chamber when opening the coffee machine. Another problem can arise if the coffee machine is actuated when opened since hot water can then spray in the direction of the user of the coffee machine.

Known from EP 1 050 258 A1 is a coffee machine wherein coffee pads are inserted in a pulled-out drawer and are then brought into the brewing position by pulling in the drawer. For sealing the brewing chamber, a brewing chamber upper portion is automatically moved over the coffee pad from above before the brewing process. After the brewing process, the coffee pads are automatically removed inside the coffee machine in a collecting container. Particularly as a result of the motor-driven components of the coffee machine, this is very complex and therefore expensive to produce.

SUMMARY

It is the object of the invention to provide a simple possibility for supplying or removing coffee pads in a coffee machine comprising a drawer.

This object is achieved with the features of the independent claim.

Advantageous embodiments of the invention are given in the dependent claims.

The invention builds on the generic coffee machine in that the drawer is positioned on the coffee machine in a detachable manner for the withdrawal thereof. In this way, the used coffee pad can be removed from the coffee machine together with the drawer before then being removed from the drawer. This removal of the coffee pad from the drawer can preferably be effected without touching the coffee pad, by tipping out the drawer.

It is usefully provided that the drawer has continuations which project substantially in the slide-in direction, engaging in guides of the coffee machine housing for mounting the drawer in an open position. These continuations prevent any tilting of the drawer during insertion into the housing. As a result of the centring effect of the continuations, the drawer is already largely aligned with respect to the housing during insertion of the actual receiving area of the drawer.

It is particularly useful if the ends of the continuations for the centring insertion of the drawer are at least slightly bevelled with respect to the direction of insertion. The drawer thereby slides into the housing with low resistance and without tilting.

It is provided that in a closed position the drawer abuts at least partially positively against the housing. In this case, the continuations are housed in recesses on the rear side of the housing whilst other areas of the drawer abut positively against the correspondingly shaped housing parts.

The invention is advantageously further developed whereby the drawer can be inserted substantially horizontally into a niche of the coffee machine and the drawer has at least one opening in its base which, in the closed position of the drawer, is at least partially surrounded by at least one substantially vertically displaceable retaining device so that the coffee pad retainer can be raised by the retaining device and the brewing chamber is closed by raising the coffee pad retainer. In such an embodiment wherein clamps are provided to raise the coffee pad retainer, it is particularly useful to provide guide continuations. These prevent the drawer from hitting the clamps of the retaining device.

The drawer is usefully constructed such that in addition to a central opening in the bottom of the drawer, further openings are provided. These further openings allow steam produced underneath the brewing chamber to escape upwards through openings in the bottom of the drawer.

In a particularly advantageous embodiment, the coffee pad retainer is mounted in a telescopic manner on the drawer. The coffee pad retainer is thereby reliably guided in the drawer for raising and lowering. Such guidance which is preferably embodied as telescopic according to the invention, can for example be formed by coaxially nested pipe sections on the coffee pad holder and on the drawer. This telescopic guidance ensures perturbation-free raising and lowering of the coffee pad holder.

The invention is based on the finding that a drawer which is in particular fitted with guide continuations and is mounted on the coffee machine in a detachable manner for the withdrawal thereof, allows convenient handling of a coffee machine.

BRIEF DESCRIPTION OF THE DRAWINGS

The invention is now explained in detail with reference to the accompanying drawings using particularly preferred embodiments. In the figures:

FIG. 1a is a perspective view of a coffee machine in a first state to explain the invention;

FIG. 1b is a perspective view of a coffee machine in a second state to explain the invention;

FIG. 3a is a frontal sectional view of a housing part of a coffee machine according to the invention; and FIG. 3b is a sectional view from above of a coffee machine with a drawer according to the invention with a coffee pad retainer inserted therein FIG. 1a shows a perspective view of a coffee machine in a first state to explain the invention. FIG. 1b shows a perspective view of a coffee machine in a second state to explain the invention. The coffee machine 110 according to the invention comprises a flat front portion 112 and a columnar rear assembly 114. Cups for removing coffee via an outlet 116 can be arranged on the front portion 112. A water container 118 is inserted in the rear assembly 114. The rear assembly 114 further comprises a slide-in area 120 into which a drawer 122 with a coffee pad retainer inserted therein can be slid, this being described in further detail in connection with FIGS. 2a and 2b. The drawer 122 provided with guide continuations 130 is shown in the inserted state in FIG. 1a and in the removed state in FIG. 1b. Located above the slide-in area 120 inside the housing are a water supply and a retainer cover which together with the retainer sitting in the drawer 122 form the brewing chamber. This is sealed after inserting the drawer 122 by shifting the lever 124 and lifting the clamps 126, 128 hereby effected by pressing together the retainer and retainer cover.

DETAILED DESCRIPTION

Figure 2A:
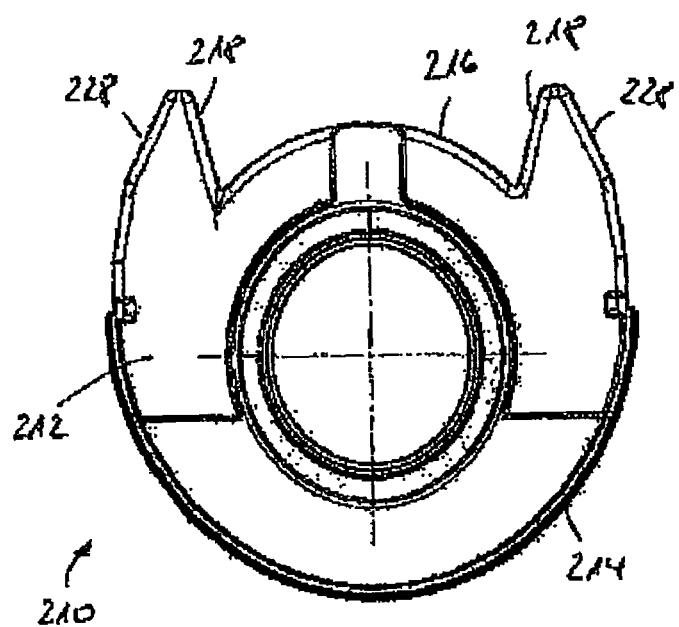
FIG. 2a is a plan view of a drawer according to the invention.

FIG. 2a shows a plan view of drawer according to the invention. The drawer 210 has a base area 212 and an elevated edge area 214, 216. Guide continuations 218 are further provided to facilitate the insertion of the drawer 210 in the slide-in area 120 (see FIG. 1b). The guide continuations 218 have slopes 228 which face the side walls of the slide-in area 120 (see FIG. 1b) during insertion. Further openings can be provided in the bottom of the drawer 210 adjacent to the edge zone 214 of the drawer 210. Steam produced underneath the drawer 210 can escape via these.

Figure 2B:
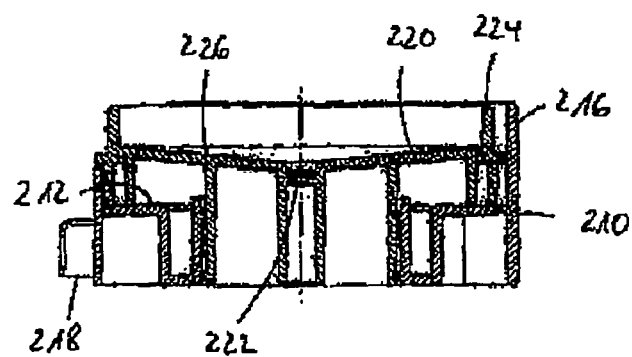
FIG. 2b is a side view of a drawer according to the invention with a coffee pad retainer inserted.
Figure 36:
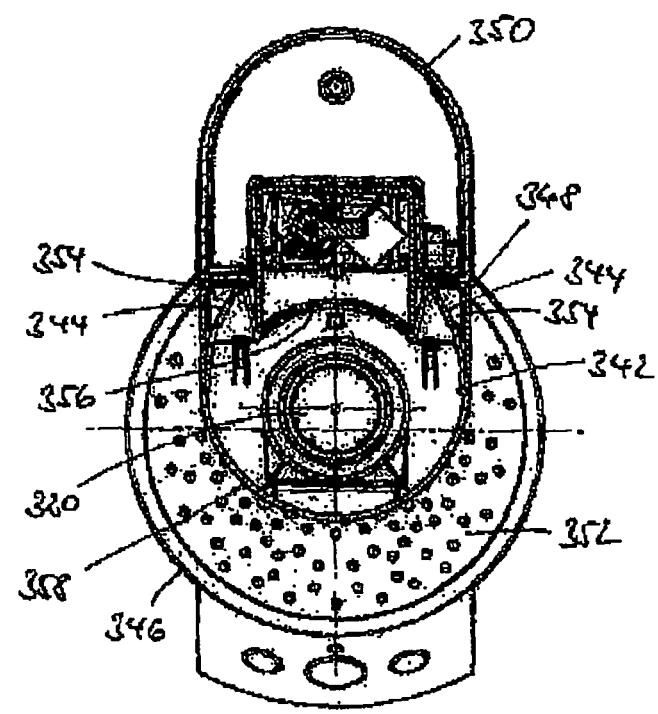

FIG. 2b shows a side view of a drawer according to the invention with a coffee pad retainer inserted therein. It can be seen here that the drawer 210 is produced using little material and positively receives the coffee pad retainer 220. The coffee pad retainer 220 itself has a circumferential edge 224 and the base area 226 of the coffee pad retainer 220 is constructed as sloping towards the centre, that is towards the outlet opening 222. The base area 226 can be provided with spacers not shown here, which can be formed for example by knobs or circular segments having different angles of ascent. It is also possible to place a grid, for example, a wire grid on the base area 226 and thus ensure a spacing between the coffee pad and the base area 226.

FIG. 3a shows a frontal sectional view of a housing part of a coffee machine according to the invention. FIG. 3b shows a sectional view from above of a coffee machine comprising a drawer according to the invention with a coffee pad retainer inserted therein. Numerous details of the coffee machine according to the invention are shown. In particular, the brewing chamber 330 formed from the coffee pad retainer 320 and a retainer cover 328 can be seen. The retainer cover 328 is preferably made of elastic silicone whilst the coffee pad retainer 320 is made of hard plastic. Consequently, a sealed pressure chamber or a sealed brewing chamber 330 can be formed by pressing the coffee pad retainer 320 on to the retainer cover 328. The water required for preparing the coffee is supplied to a channel 332 above the brewing chamber 330 and from there it passes through openings in the retainer cover 328, which are not shown, into the brewing chamber 330. Furthermore, projections 334 can be provided on the retainer cover 328 which press the inserted coffee pad against the coffee pad retainer 320. The coffee pad retainer 320 is pressed against the retainer cover 328 by lifting the clamps 336, 338. These clamps 336, 338 grip under the coffee pad retainer 320 with continuations at their lower end and rest on end regions of a shaft 340 with continuations at the opposite end. These end regions of the shaft 340 have a larger diameter in the sectional plane than perpendicular to the sectional plane so that the clamps 336, 338 can be lowered by twisting the shaft through 900. The coffee pad retainer 220 can hereby be lowered whereupon it can be removed together with the drawer 342 from the coffee machine. In the inserted state of the drawer 342, the continuations 344 of the drawer 342 lie in recesses 354 which are formed in the transition zone between the front portion 346 and the rear assembly 348. Furthermore, the edge zone 356 of the drawer 342 abuts positively against a correspondingly shaped housing region. The drawer 342 can thus be centred by the continuations 344 during insertion and then sits in a defined manner in the housing as a result of the positive connection. The other edge zone 358 of the drawer 342 is in alignment with the outer contour of the adjacent housing areas. In the diagram in FIG. 3b a drip grid 352 placed on the front portion 346 and a water container 350 placed on the rear assembly 348 are additionally shown.

The features of the invention disclosed in the preceding description, in the drawings and in the claims can be important for carrying out the invention both individually and also in any combination.

Reference List
110 Coffee machine
112 Front portion
114 Rear assembly
116 Outlet
118 Water container
120 Slide-in area, niche
122 Drawer
124 Lever
126 Clamp
128 Clamp
130 Guide continuations
210 Drawer
212 Base area
214 Edge area
216 Edge area 218 Guide continuations
220 Coffee pad retainer
222 Outlet opening
224 Circumferential edge
226 Base area
228 Slopes
320 Coffee pad retainer
328 Retainer cover
330 Brewing chamber
332 Channel
334 Projections
336 Clamp
338 Clamp
340 Shaft
342 Drawer
344 Guide continuations
346 Front portion
348 Rear assembly
350 Water container
352 Drip grid
354 Recesses
356 Edge zone
358 Edge zone

The invention claimed is:

1. A coffee machine comprising:
a housing and a brewing chamber disposed within the housing; and
a drawer for supplying coffee pads into the brewing chamber, the drawer being removably and detachably connected to the housing; wherein in addition to a central opening, further openings are provided in the bottom of the drawer.

2. The coffee machine according to claim 1, wherein the drawer has guide continuations which project substantially in the direction of insertion and which engage in guides of the housing of the coffee machine for mounting the drawer in an open position.

3. The coffee machine according to claim 2, wherein the ends of the continuations are at least slightly bevelled with respect to the direction of insertion for centering insertion of the drawer.

4. The coffee machine according to claim 1, wherein in a closed position, the drawer abuts at least partly positively against the housing.

5. The coffee machine according to claim 1, wherein a coffee pad retainer is mounted telescopically on the drawer such that the coffee pad retainer can be moved telescopically from a first position in which the brewing chamber is open, to a second position in which the brewing chamber is closed.

6. The coffee machine according to claim 1, further comprising a retainer cover that forms an upper region of the brewing chamber, and
a coffee pad retainer that forms a lower region of the brewing chamber.

7. The coffee machine according to claim 6, wherein the retainer cover is made of an elastic material.

8. The coffee machine according to claim 6, further comprising at least one projection on a bottom side of the retainer cover, the projection being for pressing a coffee pad against the coffee pad retainer.

9. The coffee machine according to claim 6, further comprising a plurality of projections on a bottom side of the retainer cover, the projections being for pressing a coffee pad against the coffee pad retainer.

10. The coffee machine according to claim 6, further comprising a substantially vertically displaceable retaining device that raises the coffee pad retainer to close the brewing chamber.

11. A coffee machine comprising:
a housing and a brewing chamber disposed within the housing; and
a drawer for supplying coffee pads into the brewing chamber, the drawer being removably and detachably connected to the housing,
wherein the drawer can be inserted substantially horizontally into a niche of the coffee machine and the drawer has at least one opening in its base which, in the closed position of the drawer, is at least partially surrounded by at least one substantially vertically displaceable retaining device so that a coffee pad retainer can be raised by the retaining device and the brewing chamber is closed by raising the coffee pad retainer.

12. The coffee machine according to claim 11, wherein the drawer has guide continuations which project substantially in the direction of insertion and which engage in guides of the housing of the coffee machine for mounting the drawer in an open position.

13. The coffee machine according to claim 12, wherein the ends of the continuations are at least slightly bevelled with respect to the direction of insertion for centering insertion of the drawer.

14. The coffee machine according to claim 11, wherein in a closed position, the drawer abuts at least partly positively against the housing.

15. The coffee machine according to claim 11, wherein in addition to a central opening, further openings are provided in the bottom of the drawer.

16. The coffee machine according to claim 11, wherein a coffee pad retainer is mounted telescopically on the drawer.

17. The coffee machine according to claim 11, further comprising a retainer cover that forms an upper region of the brewing chamber.

18. The coffee machine according to claim 17, wherein the retainer cover is made of an elastic material.

19. The coffee machine according to claim 17, further comprising at least one projection on a bottom side of the retainer cover, the projection being for pressing a coffee pad against the coffee pad retainer.

20. The coffee machine according to claim 17, further comprising a plurality of projections on a bottom side of the retainer cover, the projections being for pressing a coffee pad against the coffee pad retainer.

* * * * *